US012776304B2

(12) United States Patent
Chiu et al.

(10) Patent No.: US 12,776,304 B2
(45) Date of Patent: Oct. 27, 2026

(54) SELF-SUPERVISED LEARNING FOR AUDIO PROCESSING

(71) Applicant: Google LLC, Mountain View, CA (US)

(72) Inventors: Chung-Cheng Chiu, Sunnyvale, CA (US); Weikeng Qin, Sunnyvale, CA (US); Jiahui Yu, Bellevue, WA (US); Yonghui Wu, Fremont, CA (US); Yu Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 123 days.

(21) Appl. No.: 18/832,864

(22) PCT Filed: Jan. 30, 2023

(86) PCT No.: PCT/US2023/061558
§ 371 (c)(1),
(2) Date: Jul. 24, 2024

(87) PCT Pub. No.: WO2023/147539
PCT Pub. Date: Aug. 3, 2023

(65) Prior Publication Data

US 2025/0118291 A1 Apr. 10, 2025

Related U.S. Application Data

(60) Provisional application No. 63/304,455, filed on Jan. 28, 2022.

(51) Int. Cl.
*G10L 15/16* (2006.01)
*G10L 15/04* (2013.01)
*G10L 15/06* (2013.01)

(52) U.S. Cl.
CPC ........... *G10L 15/063* (2013.01); *G10L 15/04* (2013.01); *G10L 15/16* (2013.01)

(58) Field of Classification Search
CPC ........ G10L 15/063; G10L 15/04; G10L 15/16
See application file for complete search history.

(56) References Cited

U.S. PATENT DOCUMENTS

2016/0232440 A1* 8/2016 Gregor .................. G06N 3/044
2018/0268806 A1* 9/2018 Chun .................... G10L 13/027
2020/0005766 A1* 1/2020 Kim ....................... G10L 15/02

FOREIGN PATENT DOCUMENTS

JP 2021-022031 A 2/2021

OTHER PUBLICATIONS

Babu et al., "XLS-R: Self-supervised Cross-lingual Speech Representation Learning at Scale," CoRR, Submitted on Nov. 17, 2021, arXiv:2111.09296v1, 23 pages.

(Continued)

*Primary Examiner* — Mahelet Shiberou
(74) *Attorney, Agent, or Firm* — Fish & Richardson P.C.

(57) ABSTRACT

Methods, computer systems, and apparatus, including computer programs encoded on computer storage media, for training an audio-processing neural network that includes at least (1) a first encoder network having a first set of encoder network parameters and (2) a decoder network having a set of decoder network parameters. The system obtains a set of un-labeled audio data segments, and generates, from the set of un-labeled audio data segments, a set of encoder training examples. The system performs training of a second encoder neural network that includes at least the first encoder neural network on the set of generated encoder training examples. The system also obtains one or more labeled training examples, and performs training of the audio-processing neural network on the labeled training examples.

19 Claims, 5 Drawing Sheets

(56) References Cited

OTHER PUBLICATIONS

Baevski et al., "Effectiveness of self-supervised pre-training for speech recognition," CoRR, Submitted on Nov. 10, 2019, arXiv:1911.03912v1, 10 pages.
Baevski et al., "vq-wav2vec: Self-Supervised Learning of Discrete Speech Representations," CoRR, Submitted on Feb. 16, 2020, arXiv:1910.05453v3, 12 pages.
Baevski et al., "wav2vec 2.0: A Framework for Self-Supervised Learning of Speech Representations," CoRR, Submitted on Oct. 22, 2020, arXiv:2006.11477v3, 19 pages.
Bai et al., "Joint Unsupervised and Supervised Training for Multilingual ASR," CoRR, Submitted on Nov. 15, 2021, arXiv:2111.08137v1, 5 pages.
Bao et al., "BEiT: BERT Pre-Training of Image Transformers," CoRR, Submitted on Sep. 3, 2022, arXiv:2106.08254v2, 18 pages.
Chiu et al., "Self-supervised Learning with Random-projection Quantizer for Speech Recognition," CoRR, Submitted on Jun. 29, 2022, arXiv:2202.01855v2, 10 pages.
Chung et al., "W2v-BERT: Combining Contrastive Learning and Masked Language Modeling for Self-Supervised Speech Pre-Training," CoRR, Submitted on Sep. 13, 2021, arXiv:2108.06209v2, 7 pages.
Conneau et al., "Unsupervised Cross-lingual Representation Learning for Speech Recognition," CoRR, Submitted on Dec. 15, 2020, arXiv:2006.13979v2, 12 pages.
Devlin et al., "BERT: Pre-training of Deep Bidirectional Transformers for Language Understanding," CoRR, Submitted on May 24, 2019, arXiv:1810.04805v2, 16 pages.
Glorot et al., "Understanding the difficulty of training deep feedforward neural networks," Paper, Presented at of Proceedings of the 13th International Conference on Artificial Intelligence and Statistics, Sardinia, Italy, May 13-15, 2010; JMLR, 2010 9:249-256.
Graves, "Sequence Transduction with Recurrent Neural Networks," CoRR, Submitted on Nov. 14, 2012, arXiv:1211.3711v1, 9 pages.
Gulati et al., "Conformer: Convolution-augmented Transformer for Speech Recognition," CoRR, Submitted on May 16, 2020, arXiv:2005.08100v1, 5 pages.
He et al., "Masked Autoencoders Are Scalable Vision Learners," CoRR, Submitted on Dec. 19, 2021, arXiv:2111.06377v3, 14 pages.
Hsu et al., "HuBERT: Self-Supervised Speech Representation Learning by Masked Prediction of Hidden Units," CoRR, Submitted on Jun. 14, 2021, arXiv:2106.07447v1, 10 pages.
International Preliminary Report on Patentability in International Appln. No. PCT/US2023/061558, mailed on Aug. 8, 2024, 9 pages.
International Search Report and Written Opinion in International Appln. No. PCT/US2023/061558, mailed on Apr. 25, 2023, 15 pages.
Kahn et al., "Libri-Light: A Benchmark for ASR with Limited or No Supervision," Paper, Presented at Proceedings of the IEEE International Conference on Acoustics, Speech and Signal Processing, Barcelona, Spain, May 4-8, 2020, pp. 7669-7673.
Kingma et al., "Adam: A Method for Stochastic Optimization," CoRR, Submitted on Apr. 23, 2015, arXiv:1412.6980v5, 13 pages.
Li et al., "Scaling End-to-End Models for Large-Scale Multilingual ASR," CoRR, Submitted on Sep. 11, 2021, arXiv:2104.14830v2, 8 pages.
Pratap et al., "MLS: A Large-Scale Multilingual Dataset for Speech Research," CoRR, Submitted on Dec. 19, 2020, arXiv:2012.03411v2, 10 pages.
Radford et al., "Improving Language Understanding by Generative Pre-Training," Dec. 31, 2018, retrieved on May 15, 2025, retrieved from URL <https://s3-us-west-2.amazonaws.com/openai-assets/research-covers/language-unsupervised/language_understanding_paper.pdf>, 12 pages.
Sainath et al., "A Streaming On-Device End-to-End Model Surpassing Server-Side Conventional Model Quality and Latency," CoRR, Submitted on May 1, 2020, arXiv:2003.12710v2, 5 pages.
Schneider et al., "wav2vec: Unsupervised Pre-training for Speech Recognition," CoRR, Submitted on Sep. 11, 2019, arXiv:1904.05862v4, 9 pages.
Schuster et al., "Japanese and Korean voice search," Paper, Presented at Proceedings of the 2012 IEEE International Conference on Acoustics, Speech and Signal Processing (ICASSP), Kyoto, Japan, Mar. 25-30, 2012, pp. 5149-5152.
Van den Oord et al., "Neural Discrete Representation Learning," CoRR, Submitted on May 30, 2018, arXiv:1711.00937v2, 11 pages.
Vaswani et al., "Attention Is All You Need," CoRR, Submitted on Jun. 20, 2017, arXiv:1706.03762v3, 16 pages.
Yu et al., "FastEmit: Low-latency Streaming ASR with Sequence-level Emission Regularization," CoRR, Submitted on Feb. 3, 2021, arXiv:2010.11148v2, 5 pages.
Zazo et al., "Feature Learning with Raw-Waveform CLDNNs for Voice Activity Detection," Paper, Presented at Proceedings of the Interspeech conference, San Francisco, CA, Sep. 8-12, 2016, pp. 3668-3672.
Zhang et al., "BigSSL: Exploring the Frontier of Large-Scale Semi-Supervised Learning for Automatic Speech Recognition," CoRR, Submitted on Sep. 27, 2021, arXiv:2109.13226v1, 14 pages.
Zhang et al., "Pushing the Limits of Semi-Supervised Learning for Automatic Speech Recognition," CoRR, Submitted on Jul. 20, 2022, arXiv:2010.10504v2, 11 pages.
Office Action in Japanese Appln. No. 2024-544804, mailed on Jul. 8, 2025, 5 pages (with machine translation).

* cited by examiner

450

| Method | Size (B) | WBR (test-other) | Relative latency (ms) |
|---|---|---|---|
| Conformer 0.1B | 0.1 | 9.8 | 0 |
| Conformer 0.6B | 0.6 | 9.4 | 15.3 |
| Non-Streaming pre-train | | | |
| wav2vec 2.0 | 0.6 | 7.2 | -10.1 |
| w2v-BERT | 0.6 | 6.9 | -0.7 |
| BEST-RQ | 0.6 | 6.6 | -16.3 |
| Streaming pre-train | | | |
| wav2vec 2.0 | 0.6 | 7.9 | -130.6 |
| w2v-BERT | 0.6 | 8.1 | -117.1 |
| BEST-RQ | 0.6 | 6.6 | -130.9 |

FIG. 4

500

| Exp. | Languages | | | | | | | | Avg. |
|---|---|---|---|---|---|---|---|---|---|
| | en | de | nl | fr | es | it | pt | pl | |
| **MLS-full** | | | | | | | | | |
| wav2vec 2.0 from XLSR-53 (Conneau et., 2020) | - | 7.0 | 10.8 | 7.6 | 6.3 | 10.4 | 14.7 | 17.2 | 10.6 |
| w2v-BERT from JUST (Bai et al., 2021 | 6.6 | 4.3 | 9.9 | 5.0 | 3.8 | 9.1 | 14.6 | 8.1 | 7.8 |
| JUST (Bai et al., 2021) (co-train) | 6.5 | 4.1 | 9.5 | 5.2 | 3.7 | 8.8 | 8.0 | 6.6 | 6.5 |
| w2v-BERT (0.6B) | 5.5 | 4.3 | 10.9 | 5.6 | 4.5 | 10.1 | 13.4 | 11.2 | 8.2 |
| BEST-RQ (0.6B) | 6.8 | 4.1 | 9.7 | 5.0 | 4.9 | 7.4 | 9.4 | 5.2 | 6.6 |
| **MLS-10hrs** | | | | | | | | | |
| XLSR-53 (Conneau et al., 2020) | 14.6 | 8.4 | 12.8 | 12.5 | 13.4 | 13.4 | 18.2 | 21.2 | 13.8 |
| XLS-R(0.3B) (Babu et al., 2021) | 15.0 | 9.0 | 13.5 | 12.4 | 8.1 | 13.1 | 17.0 | 13.9 | 12.8 |
| XLS-R(1B) (Babu et al., 2021) | 12.9 | 7.4 | 11.6 | 10.2 | 7.1 | 12.0 | 15.8 | 10.5 | 10.9 |
| XLS-R(2B) (Babu et al., 2021) | 14.0 | 7.6 | 11.8 | 10.0 | 6.9 | 12.1 | 15.6 | 9.8 | 11.0 |
| w2v-BERT (0.6B) | 12.7 | 7.0 | 12.6 | 8.9 | 5.9 | 10.3 | 14.6 | 6.9 | 9.9 |
| BEST-RQ (0.6B) | 12.8 | 7.4 | 12.7 | 9.6 | 5.4 | 9.9 | 12.1 | 7.1 | 9.6 |

FIG. 5

SELF-SUPERVISED LEARNING FOR AUDIO PROCESSING

CROSS-REFERENCE TO RELATED APPLICATION

This application is a U.S. National Stage application under 35 U.S.C. § 371 and claims the benefit of priority to International Application No. PCT/US2023/061558 having an International Filing date of 30 Jan. 2023, which claims priority to U.S. Provisional Patent Application No. 63/304,455, filed on Jan. 28, 2022, which the contents of which are hereby incorporated by reference.

BACKGROUND

This specification relates to training neural networks for performing audio processing.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains an audio-processing neural network, i.e., determining the network parameters of the audio-processing neural network.

In general, the audio-processing neural network is configured to perform an audio-processing task, and includes at least (1) a first encoder network having a first set of encoder network parameters and (2) a decoder network having a set of decoder network parameters.

In one innovative aspect, this specification describes a method for training the audio-processing neural network. The method is implemented by a system including one or more computers.

The system obtains a set of un-labeled audio data segments. Each un-labeled audio data segment includes a respective plurality of audio data frames corresponding to a plurality of time points.

The system further generates, from the set of un-labeled audio data segments, a set of encoder training examples. Each encoder training example includes a respective encoder training input and a respective encoder target label. To generate each encoder training example, the system generates the respective encoder training input by processing a respective un-labeled audio data segment in the set of un-labeled audio data segments, generates a respective set of projected vectors by applying a projection matrix to each of a set of audio data frames in the respective un-labeled audio data segment, and processes the respective set of projected vectors to generate a respective encoder target label for the encoder training example. The elements of the projection matrix are values randomly selected according to a first distribution. The first distribution can be a uniform distribution. In some implementations of the provided method, the values of the elements of the projection matrix remain unchanged during generating the set of encoder training examples.

The system then performs training of a second encoder neural network that comprises at least the first encoder neural network on the set of generated encoder training examples to update at least the first set of encoder network parameters of the first encoder neural network to a set of pre-trained values.

The system also obtains one or more labeled training examples. Each labeled training example includes an audio data training input and a corresponding audio-processing label.

The system further performs training of the audio-processing neural network on the labeled training examples to update at least (1) the first set of network parameters of the encoder network and (2) the second set of network parameters of the decoder network, wherein the first set of network parameters are initialized with the set of pre-trained values.

In some implementations of the provided method, the system further receives an audio input from an input device, and processes the audio input using at least the audio-processing neural network, after the audio-processing neural network having been trained, to generate the audio processing output corresponding to the received audio input. The system can further output the audio processing output through an output device.

In some implementations of the provided method, the audio-processing task is a speech recognition task, and the audio-processing neural network is configured to process an audio data input to generate an output that characterizes language contents represented by the audio data input. For example, the output can include a predicted text transcript of the audio data input.

In some implementations of the provided method, each audio data frame includes a plurality of audio signal filter bank coefficients. For example, each audio data frame may comprise a vector of filter bank coefficients, e.g. a vector of log-mel filter bank coefficients. In one example the audio data frames are 80-dimensional log-mel filter bank coefficients.

In some implementations of the provided method, the system further performs normalization of each audio data frame in the set of un-labeled audio data segments to a predefined mean and a predefined standard deviation before generating, from the set of un-labeled audio data segments, the set of encoder training examples.

In some implementations of the provided method, to generate the respective encoder training input, the system generates a respective masked audio data segment from the respective un-labeled audio data segment. In particular, the system selects one or more audio data frames in the respective un-labeled audio data segment, and replaces data in the one or more selected audio data frames with noise data values. The noise data values can be sampled from a second distribution, such as a normal distribution with a 0 mean value.

The system can train the second encoder neural network on an encoder training task for predicting, from one or more input audio data frames in the respective masked audio data segment, a label for the one or more selected audio data frames in the respective un-labeled audio data segment. The set of audio data frames in the respective un-labeled audio data segment can include the one or more selected audio data frames.

To select the one or more audio data frames in the respective un-labeled audio data segment, the system can determine, for each given audio data frame of the respective un-labeled audio data segment, whether to select the given audio data frame with a predefined probability, and in response to the given audio data frame having been determined to be selected, selecting the given audio data frame and a predefined number of consecutive audio data frames after the given audio data frame in the respective un-labeled audio data segment.

In some implementations of the provided method, the values of the elements of the projection matrix remain unchanged during generating the set of encoder training examples.

In some implementations of the provided method, to process the respective set of projected vectors to generate the respective encoder target label comprises, for each given projected vector in the respective set of projected vectors, the system identifying, from a set of codebook vectors, a codebook vector that has a shortest distance from the given projected vector. The system then determines an element value of the encoder target label as an index of the identified codebook vector in the set of codebook vectors. In these implementations, the training task for the encoder can be a task for predicting, from the respective masked audio data segment, indexes of the codebook vectors identified for the one or more selected audio frames. The set of codebook vectors can be randomly generated according to a third distribution, such as a uniform distribution. The codebook vectors can remain unchanged during generating the set of encoder training examples.

In some implementations of the provided method, the second encoder neural network further comprises a softmax layer after the first encoder network.

In some implementations of the provided method, the audio-processing neural network is a non-streaming model configured to predict an audio processing output for a given time point based on an audio data input that includes data frames corresponding time points prior to and after the given time point.

In some implementations of the provided method, the audio-processing neural network is a streaming model configured to predict an audio processing output for a given time point based on an audio data input that includes data frames corresponding time points prior to or at the given time point.

In some implementations of the provided method, the decoder network includes one or more recurrent neural networks (RNNs). For example, the decoder network can include one or more LSTM networks. In some implementations, the decoder network can include an RNN transducer.

In some implementations of the provided method, the audio-processing neural network further includes one or more additional layers that include a projection layer between the first encoder network and the decoder network.

This specification also provides a system including one or more computers and one or more storage devices storing instructions that when executed by the one or more computers, cause the one or more computers to perform the training method described above.

This specification also provides one or more computer storage media storing instructions that when executed by one or more computers, cause the one or more computers to perform the training method described above.

The subject matter described in this specification can be implemented in particular embodiments so as to realize one or more of the following advantages.

This specification describes techniques for performing self-supervised learning that combines pre-training of an audio-processing neural network using unsupervised data with fine-tuning using labeled training examples. Compared to completely supervised learning techniques, the self-supervised learning provides significant improvement in the quality of the audio processing models because this approach enables the model to learn from a large unsupervised dataset in addition to supervised learning. The capability of learning from unsupervised data is particularly beneficial when labeled data is limited and opens up new opportunities for low-resource languages and domains.

In addition, the techniques described in this specification provide several advantages over conventional self-supervised learning techniques. Conventional self-supervised learning techniques typically involve learning feature representations of the input audio data before mapping the feature representations to discrete tokens (e.g., discrete text tokens). This may lead to challenges that can impede the applicability and efficacy of the audio processing models. For example, the integration of representation learning and self-supervised learning often requires the model to act the role of providing audio representation while still being effective for the downstream tasks. An effective representation learning model, however, may not always be effective for downstream tasks. For example, a good representation learning model may require accessing the future context of the utterance, while downstream tasks may require a low latency model which prohibits the access of the future context. Further, the objectives of representation learning and self-supervised learning are not always aligned, and the combination of the two aspects often results in complex and computationally demanding algorithms.

The techniques described in this specification do not require learning feature representations of un-labeled audio data during pre-training, and thus can overcome certain challenges associated with conventional self-supervised learning techniques. Instead of performing feature representation learning, in some implementations of the described techniques, the system trains an encoder network of the audio processing model to predict masked sections of an audio data input based on the unmasked audio data that has been processed with a random-projection quantizer. The random-projection quantizer does not require representation learning, and is independent from the audio processing model. As a result, the described techniques can be used in a wide range of audio processing network architectures, and can achieve state-of-the-art prediction accuracies and speed for both streaming and non-streaming tasks while maintaining computational efficiency.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows a performance comparison between audio-processing neural networks trained using random-projection quantization pre-training and audio-processing neural networks trained using baseline methods.

FIG. 5 shows another performance comparison between audio-processing neural networks trained using random-projection quantization pre-training and audio-processing neural networks trained using baseline methods.

Like reference numbers and designations in the various drawings indicate like elements.

DETAILED DESCRIPTION

Figure 1:
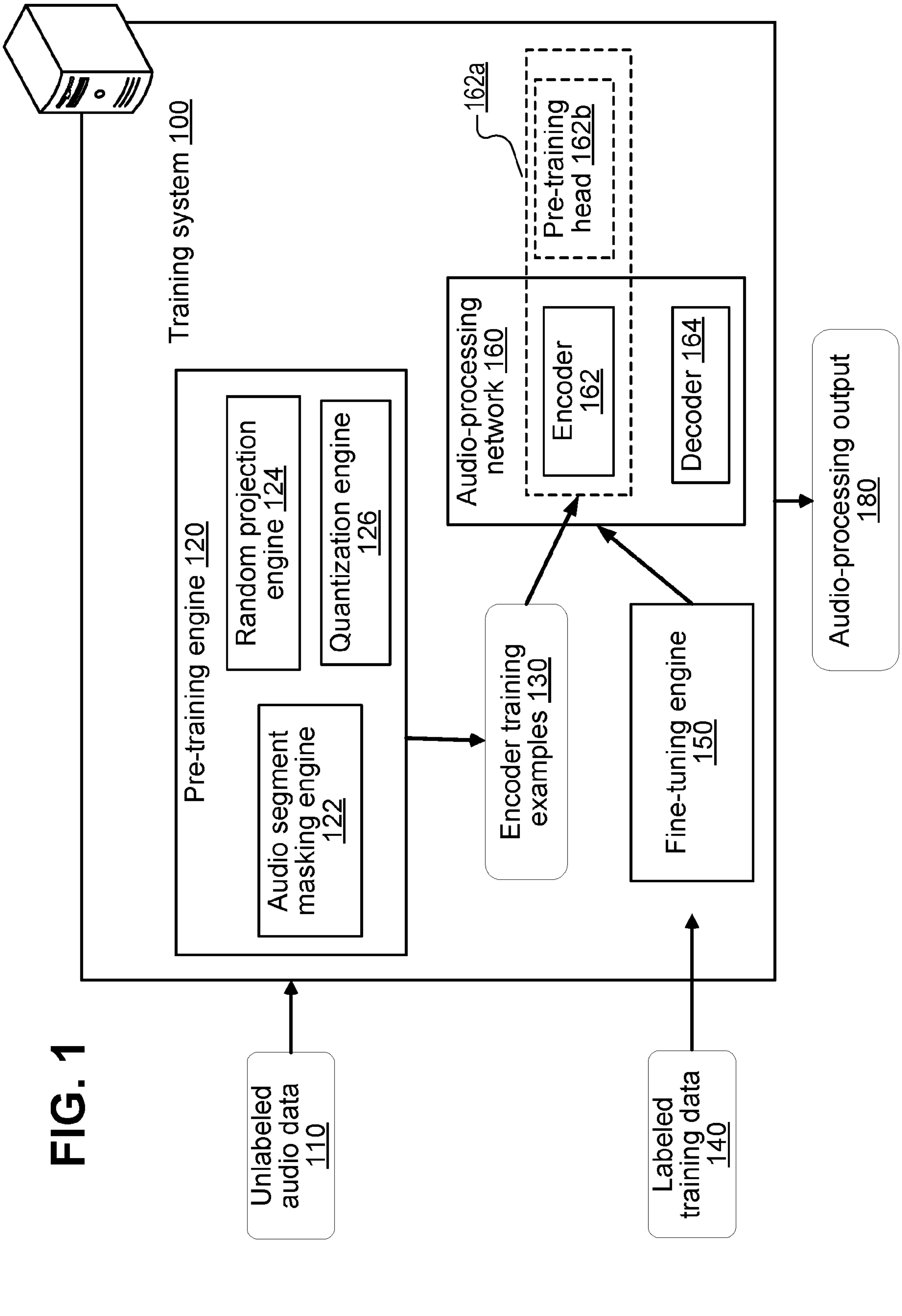
FIG. 1 shows an example training system for training an audio-processing neural network.

FIG. 1 shows an example of a training system 100 for training an audio-processing neural network 160. The system 100 is an example of a system implemented as computer programs on one or more computers in one or more locations, in which the systems, components, and techniques described below can be implemented.

In general, after the training process, the system 100 or another system can use the trained audio-processing neural network 160 to process audio data to perform an audio-processing task, such as a speech recognition task, a language identification task, a voice recognition task, a music transcription task, an audio classification task, and so on.

In a particular example for a speech recognition task, the trained neural network can be used to process audio data, e.g., data received from an audio sensing device such as a microphone, to generate a speech recognition output, e.g., an output that indicates the spoken contents in the audio data, such as a text transcript of the spoken contents.

As another example for a hotword detection task, if the input to the neural network is an audio data sequence representing a spoken utterance, the output generated by the neural network can indicate whether a particular word or phrase ("hotword") was spoken in the utterance.

As an example of a language identification task, if the input to the neural network is an audio data sequence representing a spoken utterance, the output generated by the neural network can identify the natural language in which the utterance was spoken.

As an example of a voice recognition task, the input to the neural network can be an audio data sequence representing a spoken utterance from a particular person, and the output generated by the neural network can identify the identity of the particular person.

As an example of a music transcription task, the input to the neural network can be an audio data sequence representing a music melody or a music performance, and the output generated by the neural network can identify a transcription of the music melody or performance to automatically generate a music sheet.

As an example of an audio classification task, the input to the neural network can be an audio data sequence representing a sound recorded by an audio sensor, and the output generated by the neural network can identify a classification of the sound that indicates a property or attribute of the sound, such as the identity of the subject (e.g., a particular types of devices, a type of animals) that made the sound, the conditions (e.g., under normal or abnormal condition) of the subject that makes the sound, or identify a type or condition of the sensor that recorded the sound.

In general, the input audio data includes a plurality of data frames corresponding to a plurality of time points. In some cases, the audio-processing neural network 160 can be a non-streaming model. That is, the audio-processing neural network 160 is configured to make a prediction for a given time point t based on both past and future data frames (i.e., data frames with corresponding time points both prior to and after the given time point) of the input audio data. In some other cases, the audio-processing neural network 160 can be a streaming model, where the network is configured to predict an audio processing output for a given time point based on past data frames (i.e., data frames with corresponding time points up to the given time point) but not on future data frames of the input audio data.

The audio-processing neural network 160 generally includes an encoder network 162 configured to map an audio data input to encoded data that encodes contextual information in the audio data input, and a decoder network 164 configured to map an input derived from the encoded data to the audio processing output.

The encoder network 162 and the decoder network 164 can have any appropriate architectures. A particular example of an encoder architecture is described in Zhang, et al, "Pushing the limits of semisupervised learning for automatic speech recognition," arXiv preprint arXiv: 2010.10504, 2020. Another example of the encoder architecture is described in Yu, et al., "FastEmit: Low-latency Streaming ASR with Sequence-level Emission Regularization," in Proc. ICASSP, 2021. As a particular example, the decoder architecture can include an RNN Transducer (RNN-T) with additional layers of unidirectional LSTMs.

The system 100 trains the audio-processing neural network 160 using a self-supervised learning process.

The system 100 includes a pre-training engine 120 that performs a pre-training process and a fine-tuning engine 150 that performs a fine-tuning training process.

During pre-training, the pre-training engine 120 uses unlabeled audio data 110 to update the network parameters of the encoder network 122 to a set of pre-trained values. In this specification, the unlabeled audio data refers to audio data for which training labels are not available, or even when some of the training labels are available, are not used during the training.

During fine-tuning, the fine-tuning engine 150 uses labeled training data 140 to train the audio-processing neural network 160 end-to-end to update both the network parameters of the encoder network 122 (with the parameters initialized to the pre-trained values) and the network parameters of the decoder network 124. The labeled training data 140 in general includes a set of labeled training examples. Each labeled training example includes an audio data training input and a corresponding audio-processing label. The audio-processing label is a target output of the audio-processing neural network 160 for an audio-processing task when the corresponding audio data training input is processed by audio-processing neural network 160.

In general, the pre-training process trains the encoder network 162 to learn contextual information in the unlabeled audio data 110.

In order to use the unlabeled audio data 110 to pre-train the encoder network 162, the pre-training engine 120 of the system 100 defines one or more self-supervised training tasks from the unlabeled audio data 110, and trains the encoder network 162 on the one or more self-supervised training tasks.

For example, the self-supervised training task can be a task that requires the encoder network to process an unlabeled audio data segment with portions of the data segment having been masked out (i.e., where data in masked portions having been replaced by other data, such as data sampled from a noise signal), to predict encoded data for the masked out portions of the data segment.

In particular, the system can generate, from a set of un-labeled audio data segments, a set of encoder training examples 130 for the self-supervised training task. Each encoder training example includes a respective encoder training input and a respective encoder target label.

The pre-training engine 120 can generate the respective encoder training input of each encoder training example 130 by processing a respective un-labeled audio data segment. In some implementations, an audio segment masking engine 122 can generate the encoder training input by masking out one or more sections of the respective un-labeled audio data segment. That is, the audio segment masking engine 122 can replace data in one or more sections of consecutive frames of the audio data segment with other data, such as data values sampled from a noise signal or data values set to predetermined fixed values, e.g., zeroes, that is independent of the content of the audio data segment.

The pre-training engine 120 can generate the encoder target label in each encoder training example 130 by performing a projection followed by a quantization on the respective un-labeled audio data segment. To perform the projection, a random projection engine 124 can apply a projection matrix to each of a set of audio data frames in the respective un-labeled audio data segment to generate projected data that includes, e.g., a set of projected vectors. For example, to generate a projected vector for an audio data frame comprising a vector of filter bank coefficients, the random projection engine may multiply the projection matrix by the vector of filter bank coefficients, In some cases, the projected data is generated from a set of audio data frames that have been selected to be masked out by the audio segment masking engine 122 during generating the respective encoder training input. In some other cases, the projected data can be generated from all data frames in the respective un-labeled audio data segment. The elements of the projection matrix can be values randomly selected according to a predefined distribution, such as a uniform distribution.

To perform the quantization, a quantization engine 126 can identify, from a set of template vectors (or codebook vectors), a template vector that has the shortest distance from a given projected vector, and assign an element value of the encoder target label as the index of the identified codebook vector in the set of codebook vectors. The set of codebook vectors can also be randomly generated according to a predefined distribution. In some implementations, the element values of the projection matrix and/or the codebook vectors remain fixed during the pre-training process. In this case, the self-supervised training task for the encoder can be a task for predicting, from the respective masked audio data segment, indexes of the codebook vectors identified for the selected audio frames.

In general, the random projection performs dimension reduction for the audio signals while the random codebook provides an approximated discrete representation of the audio data distribution.

In some implementations, during pre-training, the pre-training engine 120 can include a pre-training neural network head **162*b* (e.g., including one or more network layers) 162*b* as the output layer for the encoder network 162 to output the predicted labels. That is, the pre-training engine 120 trains a neural network 162*a* that includes the encoder network 162 and the pre-training neural network head 162*b*. The pre-training neural network head 162*b* will not be included during the fine-tuning process when the encoder network 162 and the decoder network 164 are trained end-to-end. The pre-training engine 120 can use the pre-training neural network head 162*b* to accommodate different architectures of the encoder network 162 and/or different types of tasks, so that the same training framework can be used for a variety of scenarios. In particular, the pre-training neural network head 162*b* can be used to select encoded embeddings outputted by the previous layer to generate the predicted labels. In some implementations, the system can re-use the same pre-trained encoder network 162** for multiple different downstream tasks, or can train a multi-task decoder that performs multiple different tasks in parallel.

In a particular example, the pre-training neural network head **162*b*** can be a softmax layer that maps the selected embedding(s) to respective logits (e.g., through one or more learned linear transformations) and then maps the logits to a probability distribution over labels, e.g., over codebook vector indices.

For example, to perform training for a non-streaming task, the system 100 can use the softmax layer **162*b* to select encoded embeddings corresponding to time points that are both before and after the frames that have been masked out, to generate the predicted labels for the masked frames. Alternatively, to perform training for a streaming task, the system 100 can use the softmax layer 162*b* to select only those encoded embeddings corresponding to the time points of, and optionally, time points before the frames that have been masked out, to generate the predicted labels for the masked frames. In some cases, for each masked out set of one or more frames, the softmax layer 162*b*** processes the encoded embedding for the time points corresponding to the masked-out set to generate the prediction for the masked-out set of frames.

Once the encoder training examples 130 have been generated, the pre-training engine 120 can update the network parameters of the encoder network 162 to the pre-trained values by minimizing a self-supervised loss computed based on the generated encoder training examples 130. The pre-training engine 120 can update the parameters through any appropriate backpropagation-based machine learning technique, e.g., using the Adam or AdaGrad optimizers.

Similarly, during fine tuning, the fine-tuning training engine 150 updates the network parameters of the encoder network 162 and the decoder network 164 by minimizing a training loss including a supervised training less computed based at least on the labeled training examples 140.

In some implementations, the audio-processing neural network 160 further includes one or more additional layers that include a projection layer between the encoder network 162 and the decoder network 164. The additional layers can be used to help the audio-processing neural network 160 to adapt to the downstream audio-processing task. For example, the projection layer is configured to multiply the output of the previous layer with a matrix, and allows projecting the output of the encoder to a dimension that matches the decoder's input dimension.

While the above description describes configurations where the self-supervised pre-training (using unlabeled data 110) is performed prior to the supervised fine-tuning (using labeled data 140), in some cases, the pre-training and the fine-tuning can be performed jointly. For example, a self-supervised pre-training loss can be used as an auxiliary loss during the fine-tuning process. That is, the system 100 can train the networks on batches that include labeled and unlabeled data or can train the networks alternately on labeled data and unlabeled data. For the unlabeled data, the system 100 can use the self-supervised pre-training loss to update the encoder 162. For the labeled data, the system 100 can either (i) use the supervised loss to update encoder 162 and decoder 164 networks, or (ii) use both the supervised and self-supervised losses to update the encoder and decoder networks.

After the audio-processing neural network 160 have been trained, the system 100 or another system can use the trained audio-processing neural network 160 to perform an audio-processing task. For example, the system 100 can receive an audio input from an input device, and processes the audio input using at least the audio-processing neural network 160 that has been trained, to generate the audio processing output 180 corresponding to the received audio input. The system 100 can further output the audio processing output 180 through an output device. For example, the audio-processing task can be a speech recognition task, and the audio-processing neural network 160 is configured to process an audio data input to generate an output that characterizes language contents represented by the audio data input. In this case, the output 180 can include a predicted text transcript of the audio data input, and can be presented to a user using an output device, such as a computer display.

Figure 2:
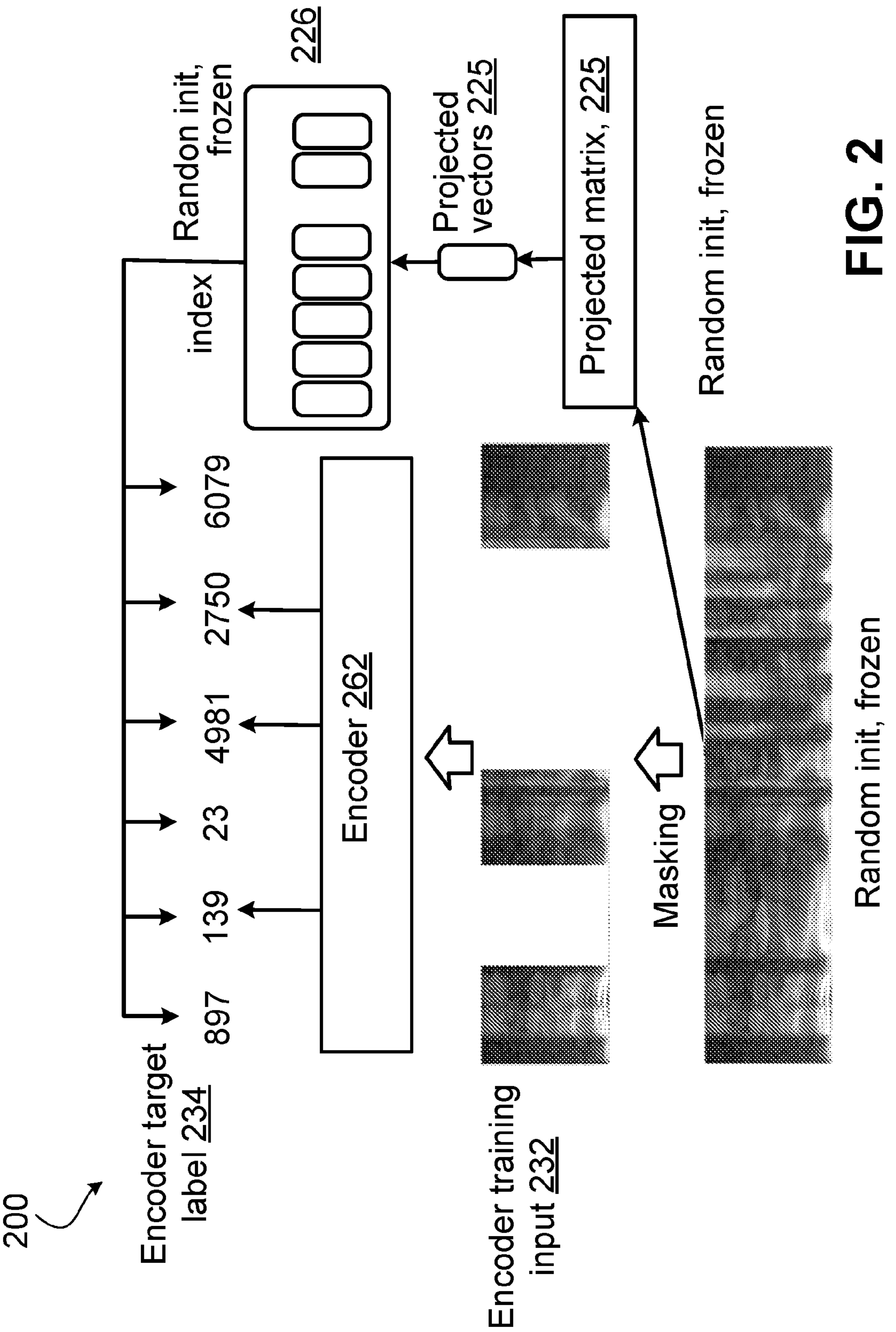
FIG. 2 shows an example process of generating self-supervised training examples for training an encoder network.

FIG. 2 illustrates an example process 200 of generating self-supervised training examples for training an encoder network. For convenience, the process 200 will be described as being performed by a system of one or more computers located in one or more locations. For example, the training system 100 of FIG. 1, appropriately programmed in accordance with this specification, can perform the process 200.

As shown in FIG. 2, the system receives an unlabeled audio segment 210. The unlabeled audio segment 210 includes a set of audio data frames corresponding to a plurality of time points (e.g., points along the horizontal axis of 210). Each audio data frame characterizes the audio signal at the corresponding time point. In one example, the audio data frame specifies a plurality of audio signal filter bank coefficients.

The system generates an encoder training input 232 by masking the unlabeled audio segment 210. In particular, the system can select one or more sections of consecutive audio data frames in the un-labeled audio data segment 210, and replace data in the selected audio data frames with noise data values. The noise data values can be sampled from a pre-defined distribution, such as a normal distribution with a 0 mean value and 0.1 standard deviations. In some implementations, the masking strategy can sample at every frame whether to apply masks to a section starting with the frame with a fixed probability. Each mask section spans from a starting frame with a fixed length.

The system applies a projection matrix 224 to audio data frames in the un-labeled audio data segment 210 to generate a set of projected vectors 225. The elements of the projection matrix 224 are values randomly selected according to a pre-defined distribution, such as a uniform distribution or any other appropriate distribution. The projection matrix 224 can be generated using any appropriate method. For example, the Xavier initialization process can be used to generate the projection matrix 224. Details of the Xavier initialization process can be found in Glorot, et al., "Understanding the difficulty of training deep feedforward neural networks," in Proceedings of the Thirteenth International Conference on Artificial Intelligence and Statistics, volume 9 of Proceedings of Machine Learning Research, pp. 249-256. PMLR, 13-15 May 2010. In some implementations, the elements of the projection matrix 224 are fixed during generating the encoder training examples.

In some implementations, before applying the projection matrix 224, the system can perform normalization of each audio data frame in the un-labeled audio data segment 210 to a predefined mean and a predefined standard deviation (e.g., a 0 mean and a standard deviation of 1). The normalization can prevent the random projection to collapse to a small subset of vectors.

After the projected vectors 225 have been generated, the system can use a codebook lookup process based on a codebook containing a set of indexed codebook vectors 226 to map the projected vectors 225 to a set of encoder target labels 234. In particular, for each given projected vector, the system identifies, from the codebook, a codebook vector that has the shortest distance from the given projected vector, and determines an element value of the encoder target label as an index of the identified codebook vector in the codebook. The codebook vectors can be vectors randomly generated according to an appropriate distribution, e.g., a uniform distribution. In some implementations, the codebook vectors remain unchanged during generating the encoder training examples.

Figure 3:
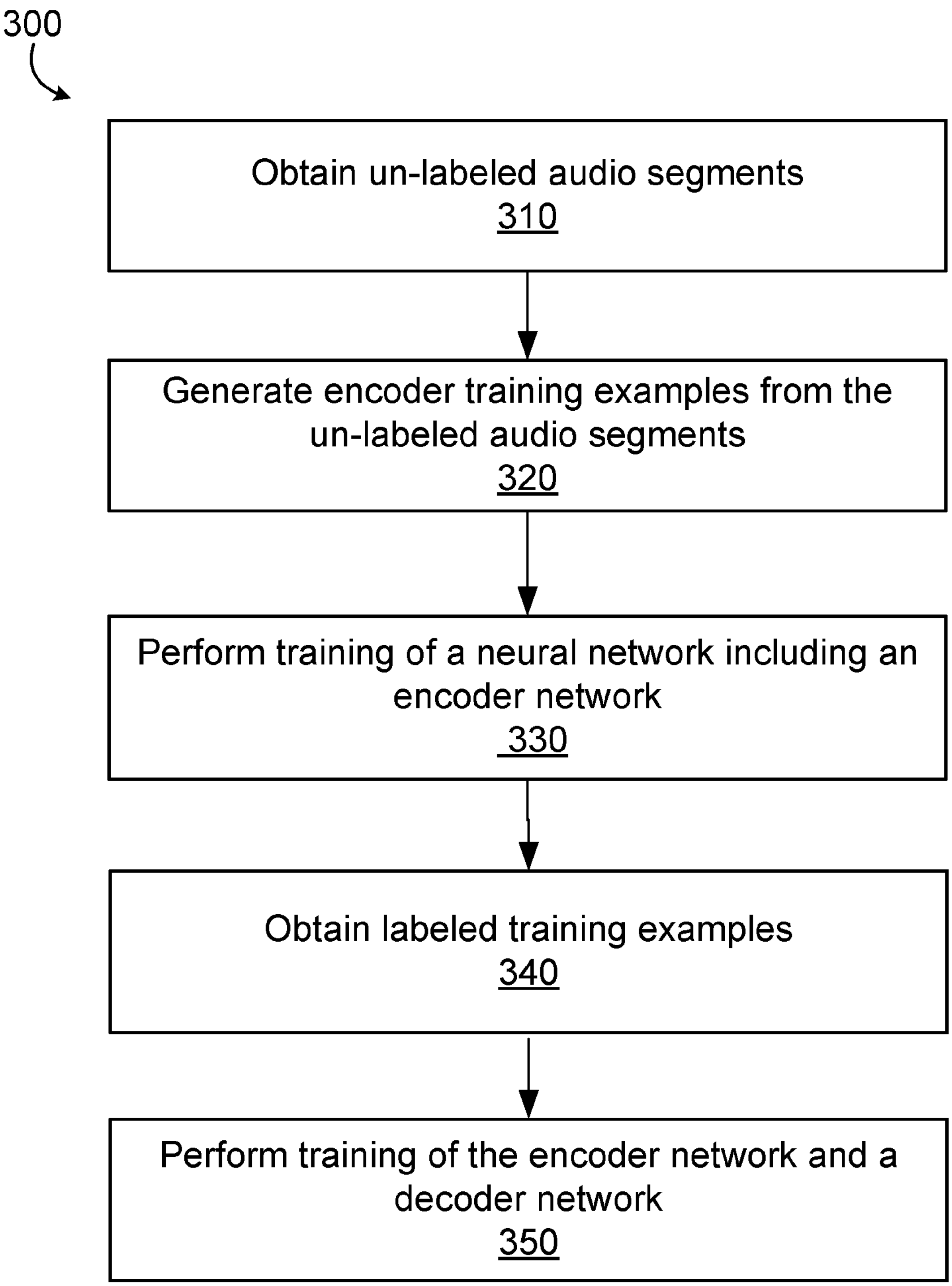
FIG. 3 is a flow diagram illustrating an example process for training an audio-processing neural network.

FIG. 3 is a flow diagram illustrating an example process 300 for training an audio-processing neural network. The audio-processing neural network is configured to perform an audio-processing task, and includes at least (1) a first encoder network having a first set of encoder network parameters and (2) a decoder network having a set of decoder network parameters.

For convenience, the process 300 will be described as being performed by a system of one or more computers located in one or more locations. For example, a training system, e.g., the training system 100 described with reference to FIG. 1, appropriately programmed in accordance with this specification, can perform the process 300.

At 310, the system obtains a set of un-labeled audio data segments. Each un-labeled audio data segment includes a respective plurality of audio data frames corresponding to a plurality of time points.

At 320, the system generates, from the set of un-labeled audio data segments, a set of encoder training examples. Each encoder training example includes a respective encoder training input and a respective encoder target label.

To generate each encoder training example, the system generates the respective encoder training input by processing a respective un-labeled audio data segment in the set of un-labeled audio data segments, generates a respective set of projected vectors by applying a projection matrix to each of a set of audio data frames in the respective un-labeled audio data segment, and processes the respective set of projected vectors to generate a respective encoder target label for the encoder training example. The elements of the projection matrix are values randomly selected according to a first distribution. The first distribution can be a uniform distribution. In some implementations, the values of the elements of the projection matrix remain unchanged during generating the set of encoder training examples.

At 330, the system performs training of a second encoder neural network that comprises at least the first encoder neural network on the set of generated encoder training examples to update at least the first set of encoder network parameters of the first encoder neural network to a set of pre-trained values.

At 340, the system obtains one or more labeled training examples. Each labeled training example includes an audio data training input and a corresponding audio-processing label. The audio-processing label is a target output of the audio-processing neural network 160 for an audio-processing task when the corresponding audio data training input is processed by audio-processing neural network.

At 350, the system further performs training of the audio-processing neural network on the labeled training examples to update at least (1) the first set of network parameters of the encoder network and (2) the second set of network parameters of the decoder network, wherein the first set of network parameters are initialized with the set of pre-trained values.

FIG. 4 shows a performance comparison 400 between audio-processing neural networks trained using random-projection quantization pre-training ("BEST-RQ"), as described with references to FIGS. 1, 2, and 3, and audio-processing neural networks trained using baseline state-of-the-art methods, including the "wav2vec 2.0" as described in Baevski, et al., "wav2vec 2.0: A framework for self-supervised learning of speech representations," arXiv preprint arXiv: 2006.11477, 2020b, and "w2v-BERT" as described in Chung, et al., "W2v-bert: Combining contrastive learning and masked language modeling for self-supervised speech pre-training," arXiv preprint arXiv: 2108.06209, 2021.

The audio-processing neural networks were trained to perform speech recognition tasks. Word-error-rates (WER) and relative latencies were calculated by using the trained models on the LibriLight dataset. As shown in FIG. 4, the training method described in this specification in general outperforms the baseline methods in both WER and latency for both streaming and non-streaming pre-training.

FIG. 5 shows the performance (specifically, WER) comparison 500 of the audio-processing neural networks for speech recognition tasks for multiple languages. As shown in FIG. 5, the training method described in this specification ("BEST-RQ") in general outperforms the baseline methods in for most of the tested languages.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training an audio processing neural network configured to perform an audio processing task, wherein the audio processing neural network comprises at least (1) a first encoder network having a first set of encoder network parameters and (2) a decoder network having a set of decoder network parameters, the method comprising:

obtaining a set of un-labeled audio data segments, each un-labeled audio data segment including a respective plurality of audio data frames corresponding to a plurality of time points;

generating, from the set of un-labeled audio data segments, a set of encoder training examples wherein each encoder training example includes a respective encoder training input and a respective encoder target label, the generating comprising, for each encoder training example:

generating the respective encoder training input, the generating comprising:

selecting one or more audio data frames from a respective un-labeled audio data segment in the set of un-labeled audio data segments, and generating, as the respective encoder training input, a respective masked audio data segment from the respective un-labeled audio data segment by replacing data in the one or more selected audio data frames with noise data values or data values set to predetermined fixed values that are independent of the content of the un-labeled audio data segment, generating a respective set of projected vectors by applying a projection matrix to each of a set of audio data frames in the respective un-labeled audio data segment, wherein elements of the projection matrix are values randomly selected according to a first distribution, and processing the respective set of projected vectors to generate a respective encoder target label for the encoder training example;

performing training of a second encoder neural network that comprises at least the first encoder neural network on the set of generated encoder training examples to update at least the first set of encoder network parameters of the first encoder neural network to a set of pre-trained values, wherein performing training of the second encoder neural network comprises:

training the second encoder neural network on an encoder training task for predicting, for each encoder training example in the set of generated encoder training examples, a label for each of one or more of the selected audio data frames in the respective masked audio data segment;

obtaining one or more labeled training examples, each labeled training example including an audio data training input and a corresponding audio-processing label; and performing training of the audio processing neural network on the labeled training examples to update at least (1) the first set of network parameters of the encoder network and (2) the second set of network parameters of the decoder network, wherein the first set of network parameters are initialized with the set of pre-trained values.

2. The method of claim 1, further comprising:

receiving an audio input from an input device; and processing the audio input using at least the audio processing neural network, after the audio processing neural network having been trained, to generate the audio processing output corresponding to the received audio input.

3. The method of claim 2, further comprising:

outputting the audio processing output through an output device.

4. The method of claim 1, wherein the audio processing task is a speech recognition task, and the audio processing neural network is configured to process an audio data input to generate an output that characterizes language contents represented by the audio data input.

5. The method of claim 4, wherein the output includes a predicted text transcript of the audio data input.

6. The method of claim 1, wherein each audio data frame includes a plurality of audio signal filter bank coefficients.

7. The method of claim 1, further comprising:

before generating, from the set of un-labeled audio data segments, the set of encoder training examples, performing normalization of each audio data frame in the set of un-labeled audio data segments to a predefined mean and a predefined standard deviation.

8. The method of claim 1, wherein generating the respective masked audio data segment from the respective un-labeled audio data segment comprises:

replacing data in the one or more selected audio data frames with noise data values.

9. The method of claim 8, wherein the set of audio data frames in the respective un-labeled audio data segment include the one or more selected audio data frames.

10. The method of claim 8, wherein the noise data values are sampled from a second distribution.

11. The method of claim 10, wherein the second distribution is a normal distribution with a 0 mean value.

12. The method of claim 8, wherein selecting the one or more audio data frames in the respective un-labeled audio data segment comprises:

determining, for each given audio data frame of the respective un-labeled audio data segment, whether to select the given audio data frame with a predefined probability, and in response to the given audio data frame having been determined to be selected, selecting the given audio data frame and a predefined number of consecutive audio data frames after the given audio data frame in the respective un-labeled audio data segment.

13. The method of claim 1, wherein the values of the elements of the projection matrix remain unchanged during generating the set of encoder training examples.

14. The method of claim 1, wherein the first distribution is a uniform distribution.

15. The method of claim 9, wherein processing the respective set of projected vectors to generate the respective encoder target label comprises, for each given projected vector in the respective set of projected vectors:

identifying, from a set of codebook vectors, a codebook vector that has a shortest distance from the given projected vector; and determining an element value of the encoder target label as an index of the identified codebook vector in the set of codebook vectors.

16. The method of claim 15, wherein the training task is a task for predicting, from the respective masked audio data segment, indexes of the codebook vectors identified for the one or more selected audio frames.

17. The method of claim 15, wherein the set of codebook vectors are randomly generated according to a third distribution.

18. A system comprising one or more computers and one or more non-transitory storage devices storing instructions that when executed by the one or more computers cause the one or more computers to perform operations for training an audio processing neural network configured to perform an audio processing task, wherein the audio processing neural network comprises at least (1) a first encoder network having a first set of encoder network parameters and (2) a decoder network having a set of decoder network parameters, the operations comprising:

obtaining a set of un-labeled audio data segments, each un-labeled audio data segment including a respective plurality of audio data frames corresponding to a plurality of time points;

generating, from the set of un-labeled audio data segments, a set of encoder training examples wherein each encoder training example includes a respective encoder training input and a respective encoder target label, the generating comprising, for each encoder training example:

generating the respective encoder training input, the generating comprising:

selecting one or more audio data frames from a respective un-labeled audio data segment in the set of un-labeled audio data segments, and generating, as the respective encoder training input, a respective masked audio data segment from the respective un-labeled audio data segment by replacing data in the one or more selected audio data frames with noise data values or data values set to predetermined fixed values that are independent of the content of the un-labeled audio data segment, generating a respective set of projected vectors by applying a projection matrix to each of a set of audio data frames in the respective un-labeled audio data segment, wherein elements of the projection matrix are values randomly selected according to a first distribution, and processing the respective set of projected vectors to generate a respective encoder target label for the encoder training example;

performing training of a second encoder neural network that comprises at least the first encoder neural network on the set of generated encoder training examples to update at least the first set of encoder network parameters of the first encoder neural network to a set of pre-trained values, wherein performing training of the second encoder neural network comprises:

training the second encoder neural network on an encoder training task for predicting, for each encoder training example in the set of generated encoder training examples, a label for each of one or more of the selected audio data frames in the respective masked audio data segment;

obtaining one or more labeled training examples, each labeled training example including an audio data training input and a corresponding audio-processing label; and performing training of the audio processing neural network on the labeled training examples to update at least (1) the first set of network parameters of the encoder network and (2) the second set of network parameters of the decoder network, wherein the first set of network parameters are initialized with the set of pre-trained values.

19. One or more non-transitory computer storage media storing instructions that when executed by one or more computers cause the one or more computers to perform operations for training an audio processing neural network configured to perform an audio processing task, wherein the audio processing neural network comprises at least (1) a first encoder network having a first set of encoder network parameters and (2) a decoder network having a set of decoder network parameters, the operations comprising:

obtaining a set of un-labeled audio data segments, each un-labeled audio data segment including a respective plurality of audio data frames corresponding to a plurality of time points;

generating, from the set of un-labeled audio data segments, a set of encoder training examples wherein each encoder training example includes a respective encoder training input and a respective encoder target label, the generating comprising, for each encoder training example:

generating the respective encoder training input, the generating comprising:

selecting one or more audio data frames from a respective un-labeled audio data segment in the set of un-labeled audio data segments, and generating, as the respective encoder training input, a respective masked audio data segment from the respective un-labeled audio data segment by replacing data in the one or more selected audio data frames with noise data values or data values set to predetermined fixed values that are independent of the content of the un-labeled audio data segment, generating a respective set of projected vectors by applying a projection matrix to each of a set of audio data frames in the respective un-labeled audio data segment, wherein elements of the projection matrix are values randomly selected according to a first distribution, and processing the respective set of projected vectors to generate a respective encoder target label for the encoder training example;

performing training of a second encoder neural network that comprises at least the first encoder neural network on the set of generated encoder training examples to update at least the first set of encoder network parameters of the first encoder neural network to a set of pre-trained values, wherein performing training of the second encoder neural network comprises:

training the second encoder neural network on an encoder training task for predicting, for each encoder training example in the set of generated encoder training examples, a label for each of one or more of the selected audio data frames in the respective masked audio data segment;

obtaining one or more labeled training examples, each labeled training example including an audio data training input and a corresponding audio-processing label; and performing training of the audio processing neural network on the labeled training examples to update at least (1) the first set of network parameters of the encoder network and (2) the second set of network parameters of the decoder network, wherein the first set of network parameters are initialized with the set of pre-trained values.

* * * * *